United States Patent
Cone

(10) Patent No.: US 6,543,846 B2
(45) Date of Patent: Apr. 8, 2003

(54) CHILD CAR SEAT HAVING ONE TETHERED BELT

(75) Inventor: Richard E. Cone, Athens, OH (US)

(73) Assignee: Dick Cone Industrial Design, Inc., Athens, OH (US)

( * ) Notice: Subject to any disclaimer, the term of this patent is extended or adjusted under 35 U.S.C. 154(b) by 39 days.

(21) Appl. No.: 09/864,427

(22) Filed: May 24, 2001

(65) Prior Publication Data

US 2002/0175545 A1 Nov. 28, 2002

(51) Int. Cl.[7] ................................................ A47C 1/08
(52) U.S. Cl. ...................... 297/250.1; 297/253; 297/254
(58) Field of Search ............................. 297/250.1, 253, 297/254

(56) References Cited

U.S. PATENT DOCUMENTS

| | | | |
|---|---|---|---|
| 4,768,828 A | * 9/1988 | Kohketsu | 297/250.1 |
| 4,822,104 A | * 4/1989 | Plesniarski | 297/250.1 |
| 5,383,708 A | 1/1995 | Nagasaka et al. | |
| 5,466,044 A | 11/1995 | Barley et al. | |
| 5,536,066 A | * 7/1996 | Sedlack | 297/250.1 |
| 5,630,645 A | 5/1997 | Lumley et al. | |
| 5,695,243 A | 12/1997 | Anthony et al. | |
| 5,797,654 A | 8/1998 | Stroud | |
| 5,979,982 A | 11/1999 | Nakagawa | |
| 6,017,087 A | 1/2000 | Anthony et al. | |
| 6,193,310 B1 | 2/2001 | Batalaris et al. | |
| 6,209,957 B1 | * 4/2001 | Baloga et al. | 297/250.1 X |

* cited by examiner

Primary Examiner—Anthony D. Barfield
(74) Attorney, Agent, or Firm—Frank H. Foster; Kremblas, Foster, Phillips & Pollick

(57) ABSTRACT

A child car seat is designed for attachment to an automobile seat. The child car seat includes two sets of restraining guides through which a belt is threaded to install the child car seat to the automobile seat. One set of restraining guides is for positioning the child car seat to the automobile seat in a forward-facing orientation, and another set is for a rearward-facing orientation. The installation belt has two ends and an intermediate region extending between the ends. A length adjustor is engaged to the intermediate region, and a fastener is attached to each belt end. Each fastener detachably connects to cooperating devices on an automobile seat.

15 Claims, 2 Drawing Sheets

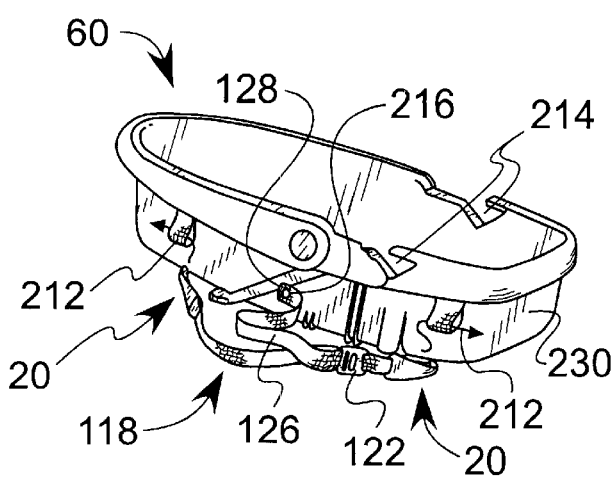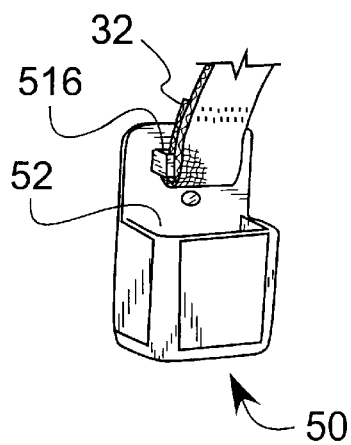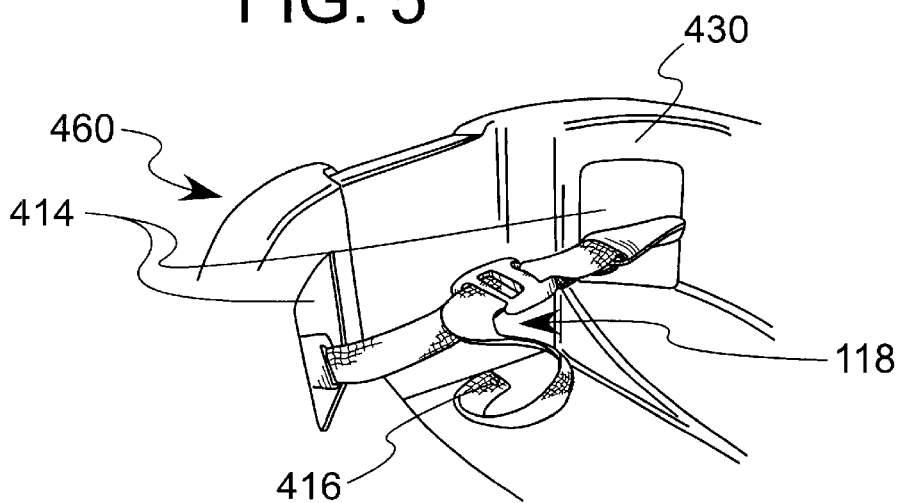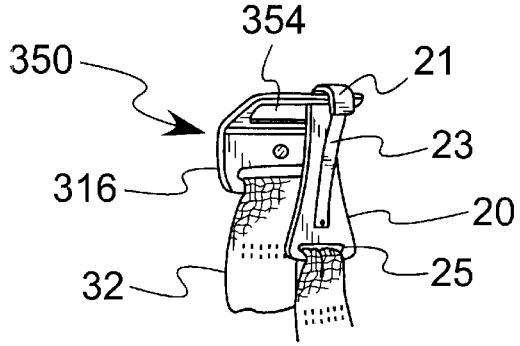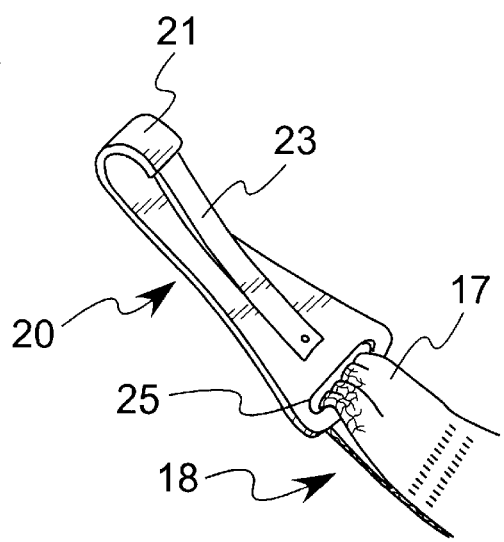
FIG. 5
FIG. 7
FIG. 6
FIG. 8
FIG. 9

CHILD CAR SEAT HAVING ONE TETHERED BELT

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO A "MICROFICHE APPENDIX"

(Not Applicable)

BACKGROUND OF THE INVENTION

1. Field of the Invention

This invention relates generally to the field of automobile seats, and more particularly is directed to a strap apparatus used to secure a child car seat to an automobile seat.

2. Description of the Related Art

Children require furniture that is modified for a child's anatomical characteristics, so that the child is safe and secure when placed in a seat or bed. One example of such furniture is a seat adapted for transporting a child in an automobile. It is well known that a parent or guardian is legally required to secure a child in a child car seat when transporting the child in an automobile. The main purpose of the child car seat is to provide a seat belt modified for a child's anatomy, so that the child is secured in the event of an automobile crash, when the momentum from the moving automobile is transferred to the unsecured bodies within the automobile.

A conventional child car seat is designed to detachably connect to an automobile passenger seat. The attachment of the conventional child car seat to the automobile passenger seat is through cooperation between structures both on the child car seat and on a conventional seat belt found on the automobile passenger seat. The conventional child car seat is formed with structures for receiving the conventional seat belt in a manner that secures the conventional child car seat in a position relative to the automobile passenger seat.

Specifically, the conventional child car seat has guides to restrain the conventional seat belt. One pair of belt restraining guides receives the conventional seat belt for positioning the conventional child car seat in the forward-facing orientation and another set for the rearward-facing orientation, relative to the automobile passenger seat. Typically, belt restraining guides are formed as openings through a region of the conventional child car seat during the injection-molding process.

The conventional seat belt on the automobile passenger seat has a conventional seat belt fastener. The conventional fastener is formed by a press-release buckle component on one portion of seat belt that receives a tongue component on another portion of seat belt. A belt length adjuster included on the buckle design permits a user to alter the length of the seat belt.

In the operation of the conventional child car seat, the child car seat is first positioned in either the forward-facing or rearward-facing orientation, relative to the automobile passenger seat. Then, one portion of the seat belt existing on the automobile passenger seat is threaded through either set of belt restraining guides. Next, the fastener component on the threaded portion is engaged to the other fastener component to secure the child car seat on the automobile passenger seat. Finally, the seat belt length is adjusted to tighten down the child car seat on the automobile passenger seat.

Recent law requires child car seats to include a permanently attached, separate installation belt for installing the child car seat on the automobile passenger seat. The separate installation belt does not attach to the conventional seat belt on the automobile seat. Rather, the separate installation belt has fasteners, requiring the automobile to have cooperating members to which the fasteners reversibly attach.

The separate installation belt ensures that the parent or guardian has a completely functional unit for installing the child car seat and is not deterred from properly installing the child car seat by the process associated with using the conventional seat belt as the installation belt. The process associated with using the conventional seat belt as the installation belt includes the steps of locating the conventional seat belt, adjusting the length, threading it through the desired set of restraining guides, and again adjusting the length to tighten down the child car seat on the automobile seat.

As a solution to the requirement for a permanently attached, separate installation belt, prior art designs attach an installation belt to each of the belt restraining guides. If the conventional child car seat has one set of belt restraining guides for the forward-facing orientation and another set for the rearward-facing orientation, then two installation belts must be permanently attached to the child car seat. This is because each installation belt has a specific length for positioning the child car seat in a respective orientation. A user is not permitted to simply remove the installation belt from permanent attachment to the set of belt restraining guides and alter the belt length for use in the other set of belt restraining guides, as such task requires detachment of the installation belt from the child car seat. Using two installation belts results in an added expense over using the seat belt existing on an automobile passenger seat.

Prior art designs have included child car seats having installation belts that thread through restraining guides for forward-facing or rearward-facing orientation with respect to the automobile passenger seat, or may include the permanent attachment of the installation belts to the child car seat. Examples of such designs are shown in the following U.S. patents: U.S. Pat. No. 6,193,310 B1 issued Feb. 27, 2001 to Batalaris et al. on a "Child car seat adapted for frontward and rearward facing configurations"; U.S. Pat. No. 6,017,087 issued Jan. 25, 2000 to Anthony et al. on a "Child restraint with a rotary coupling"; U.S. Pat. No. 5,797,654 issued Aug. 25, 1998 to Stroud on a "Belt buckle/tether strap for a booster car seat"; U.S. Pat. No. 5,979,982 issued on Nov. 9, 1999 to Nakagawa on a "Child seat"; U.S. Pat. No. 5,695,243 issued on Dec. 9, 1997 to Anthony et al. on a "Child seat mount with anti-twist web mechanism"; U.S. Pat. No. 5,630,645 issued May 20, 1997 to Lumley et al. on a "Safety seat tether strap"; U.S. Pat. No. 5,466,044 issued on Nov. 14, 1995 to Barley et al. on a "Child safety seat", and; U.S. Pat. No. 5,383,708 issued on Jan. 24, 1995 to Nagasaka et al. on a "Child seat and anchoring structure for mounting the child seat onto vehicle seat".

In summary, the prior art child car seat technology has the disadvantage of requiring two permanently attached installation belts. This results in an added expense for the consumer, as well as an awkwardly bulky child car seat due to the constant presence of an installation belt that is not in use. Any child car seat must satisfy the legal requirement for permanently attachment to the child car seat, but it is desirable to avoid the added expense of needing two installation belts.

It is, therefore, an object of the present invention to eliminate the added expense by eliminating the need for two permanently attached installation belts.

The present invention eliminates the added expense of needing two installation belts and satisfies the required structural standards for permanent attachment. The applicant invented a child car seat having a single installation belt that is permanently attached to the child car seat by a tether. In addition, the installation belt has an adjustable length and can be used in either set of belt restraining guides.

BRIEF SUMMARY OF THE INVENTION

The present invention provides an improved child car seat, the improvement being only one installation belt designed to accomplish the role of two installation belts but still meeting the requirement of permanent attachment to the child car seat. In this invention, a single installation belt is used for positioning the child car seat in either the forward-facing orientation or the rearward-facing orientation on an automobile seat. The installation belt is permanently attached to the child car seat by a tether having one end attached to the installation belt and another end attached to the child car seat.

BRIEF DESCRIPTION OF THE SEVERAL VIEWS OF THE DRAWINGS

FIG. 5 is a side elevation view of an infant carrier bed having the installation belt illustrated in FIG. 3.

FIG. 6 is a top view of a base end of the infant carrier bed having the installation belt illustrated in FIG. 3.

FIG. 7 is a side angle view of the preferred embodiment of the belt storage receptacle that is attached to the child car seat, as illustrated in FIG. 4.

FIG. 8 is a front view of an alternative embodiment of the storage receptacle.

FIG. 9 is a side angle view of the preferred embodiment of the fastener.

Figure 1:
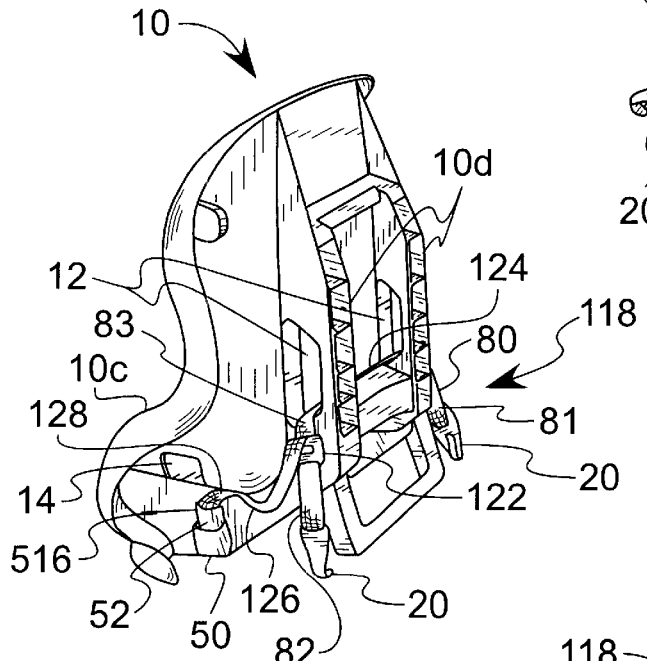
FIG. 1 is a left rear angle perspective of an apparatus embodying the present invention and utilizing parts in the operation of the present invention.

In describing the preferred embodiment of the invention, which is illustrated in the drawings, specific terminology will be resorted to for the sake of clarity. However, it is not intended that the invention be limited to the specific term so selected and it is to be understood that each specific term includes all technical equivalents, which operate in a similar manner to accomplish a similar purpose.

DETAILED DESCRIPTION OF THE INVENTION

FIG. 1 illustrates the apparatus embodying the invention. The child car seat 10 has a front 10a, a back 10b, and armrests 10c. The child car seat 10 is typically made of a durable polymer. The child car seat 10 has a pair of forward belt restraining guides 12 to hold fast an installation belt 18 for securing the child car seat 10 in a forward-facing orientation relative to an automobile passenger seat. The forward belt restraining guides 12 are duplicate passageways, one through each of the twin parallel longitudinal structures 10d that support the back 10b of the child car seat 10 against the back rest of the automobile passenger seat. A pair of rearward belt restraining guides 14 holds fast the installation belt 18 for securing the child car seat 10 in a rearward-facing orientation relative to the automobile passenger seat. The rearward belt restraining guides 14 are also duplicate passageways, one through the lower region of each armrest 10c on the child car seat 10. Both pairs of the belt restraining guides 12 and 14 are formed on the child car seat 10 during the injection molding process. Alternatively, they can be constructed of tubular steel tubing. All passageways have dimensions large enough to permit the installation belt 18 to pass freely when being threaded.

The child car seat 10 includes an anchor point 16. The anchor point 16 is preferably located on the back lower region of the child car seat 10. The anchor point 16 may be a rivet, a bolt, or a similar permanent device.

Figure 2:
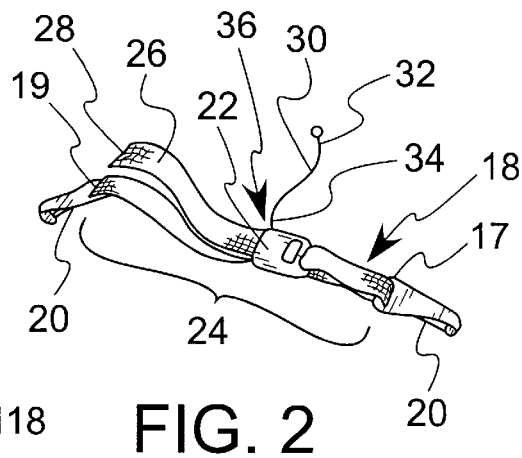
FIG. 2 is an enlarged view of the preferred embodiment of the tethered installation belt shown attached to the child car seat illustrated in FIG. 4.

The installation belt 18 has a belt first end 19 having a fastener 20 and a belt second end 17 having a fastener 20. The installation belt 18 is illustrated in FIG. 2 as a continuous piece of material having a belt length adjuster 22 engaged to a belt intermediate region 24. A belt excess portion 26 winds through and exits the belt length adjustor 22 and has a free end 28.

The installation belt 18 is made of conventional seat belt material, which typically has a thickness that is substantially less than the width. Alternatively, the material may be any flexible load-bearing material such as steel cord, chain, or polymer. However, the material must yield to the belt length adjuster 22 that firmly engages the material, typically in an orientation that imposes a series of sharp bends on the material. The material must not be so rigid as to splinter, or be so flexible as to become entangled, when passing through the belt length adjuster 22.

Also, the material composing the installation belt 18 must withstand folding. This is because the preferred structure for attaching the fastener 20 includes the belt ends 19 and 17 threaded through a slot 25 on a respective fastener 20 and folded back for attachment to the belt intermediate region 24. The material must not fracture when the belt ends 19 and 17 are permanently attached to the belt intermediate region 24 by stitches or some other penetrating attachment structure, such as a rivet. FIG. 9 illustrates the preferred structure for attaching the belt ends 17 and 19 to the slot 25 on the fastener 20.

The belt length adjuster 22 is preferably engaged to the belt intermediate region 24. Alternatively, the belt length adjuster 22 may be included as a portion of the fastener 20. The belt length adjuster 22 has the conventional design typically employed for altering the length of a conventional seat belt. The installation belt 18 is shortened when a user tugs the free end 28 to draw an amount of the belt intermediate region 24 through the belt length adjuster 22, thereby causing the amount to become part of the belt excess portion 26. Likewise, the installation belt is lengthened when the user tugs the belt intermediate region 24 to draw an amount of the belt excess portion 26 through the belt length adjuster 22, thereby causing the amount to become part of the belt intermediate region 24.

Figure 4:
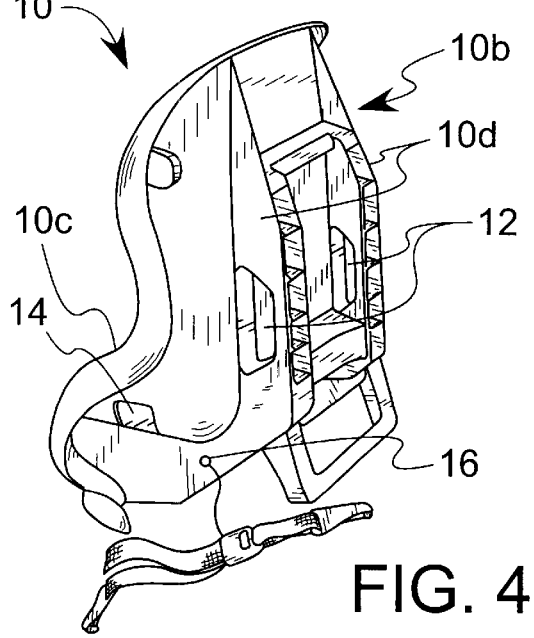
FIG. 4 is a left rear angle perspective of the apparatus embodying the invention.

The installation belt 18 is permanently moored to the child car seat 10. A tether 30 serves the purpose of permanently mooring the installation belt 18 to the child car seat 10, as illustrated in FIG. 4. The tether 30 may be a nylon cord. Alternatively, a chain, a rope, a spring, or a similar flexible load-bearing device may serve as the tether 30. The tether 30 may be made from the same material as the installation belt 18. In addition, the tether 30 may be made from material that includes an elastomeric component to enable the tether 30 to stretch.

The tether 30 extends between a tether first end 32 and a tether second end 34. The length of the tether 30 must permit the attached installation belt 18 to be positioned in either pair of belt restraining guides 12 or 14. The tether 30 may have slack, yet less slack when the installation belt 18 is in one pair of belt restraining guides compared to the amount of slack when the installation belt 18 is in the other pair of belt restraining guides. If the tether 30 is made from material that includes an elastomeric component, then there will be no slack in the tether 30 when the installation belt 18 is positioned for use. This is because the rubber component allows the length between the tether first end 32 and the tether second end 34 to increase due to stretching from the child car seat 10 to the positioned installation belt 18. When the installation belt 18 is not positioned for use, the rubber component retracts, thereby causing the tether 30 to return to its original shorter length.

The tether first end 32 is permanently attached to the anchor point 16 on the child car seat 10. The tether second end 34 is permanently attached to an anchor point 36 on the installation belt 18. In the embodiment illustrated in FIGS. 2 and 4, the anchor point 36 on the installation belt 18 is included on the belt length adjuster 22. Both anchor points 16 and 36 may be a rivet, a bolt, or a similar permanent device.

An additional alternative embodiment for the anchor point 36 on the installation belt 18 includes the tether second end 34 attached to a ring having a center. The installation belt 18 is engaged to the ring in a manner allowing the belt intermediate region 24 to pass through the ring center. However, the fastener 20 at either belt end 17 or 19 is wider than the ring diameter, and the ring is prohibited from passing the fastener 20. In this embodiment, the tether second end 34 is permanently attached to the installation belt 18 through the ring engagement, yet the tether second end 34 is mobile with respect to the belt intermediate region 24.

Figure 3:
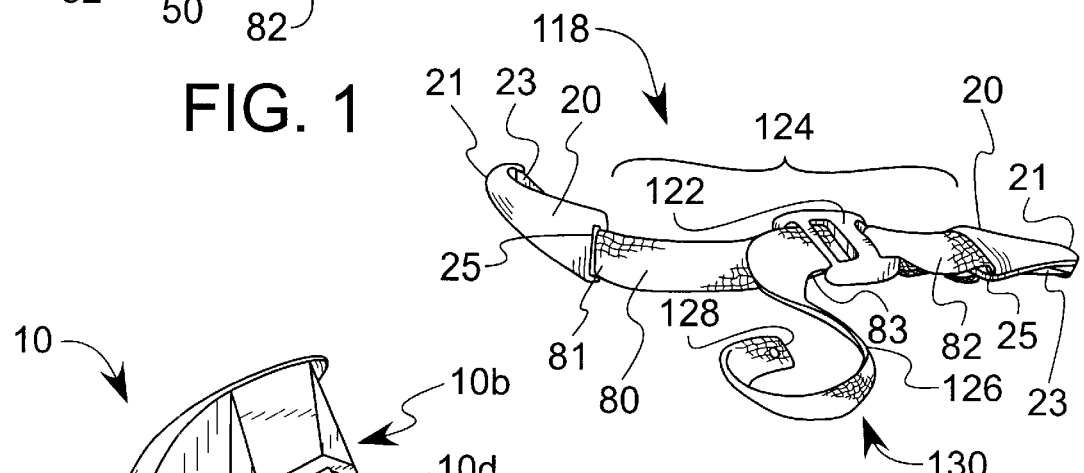
FIG. 3 is an enlarged view of an alternative embodiment of the tethered installation belt shown in FIGS. 1, 5, and 6.

An alternative embodiment for the installation belt 18 is illustrated in FIG. 3. The installation belt 118 has a belt intermediate region 124. A belt length adjustor 122 is engaged to the installation belt 118. The belt intermediate region 124 is interrupted by the belt length adjuster 122 in a manner that forms an adjustable belt portion 80 and a non-adjustable belt portion 82. The adjustable belt portion 80 has a first end 81 attached to the slot 25 on the fastener 20, and a second end 83 engaged to the belt length adjuster 122. An amount of the second end 83 winds through and exits the belt length adjustor 122 to form a belt excess portion 126 that serves as the tether 130. A free end 128 of the belt excess portion 126 attaches to the anchor point 16 on the child car seat 10. The non-adjustable belt portion 82 has a first end attached to the fastener 20 and a second end attached to the belt length adjuster 122.

To shorten the installation belt 118, the free end 128 of the belt excess portion 126 is tugged to draw an amount of the second end 83 through the length adjuster 122, thereby decreasing the length of the adjustable belt portion 80 by the amount. To lengthen the installation belt 118, the adjustable belt portion 80 is tugged to draw an amount of the belt excess portion 126 through the length adjuster 122, thereby increasing the length of the adjustable belt portion 80 by the amount. The non-adjustable belt portion 82 has a fixed length extending between the first end attached to the fastener 20 and the second end attached to the belt length adjuster 122.

In the preferred embodiment as illustrated in FIG. 1, the child car seat 10 is shown with the installation belt 118 positioned for use in the forward belt restraining guides 12. The belt intermediate region 124 has been threaded through the aligned, duplicate passageways of the twin parallel longitudinal structures 10d that support the back 10b of the child car seat 10 against the back rest of the automobile passenger seat. In FIG. 1, each fastener 20 is substantially opposite the other and is not attached to the respective cooperating loop structure on the automobile passenger seat. Only one rearward belt restraining guide 14 is visible in FIG. 1.

In operation of the preferred embodiment as illustrated in FIG. 1, a user physically threads the installation belt 118 through the passageways of the forward belt restraining guides 12. The user grasps a fastener 20 on the installation belt 118, and the user inserts the fastener 20 through one passageway on the child car seat 10. Next, the user pulls the fastener 20 to draw the belt intermediate region 124 through the passageway. Then the user inserts the fastener 20 into the remaining passageway, and pulls the fastener 20 to draw the belt intermediate region 124 through the remaining passageway until the fasteners 20 are substantially opposite each other. Finally, the user attaches the child car seat 10 by connecting each fastener 20 to a respective cooperating loop structure on the automobile passenger seat. If necessary, the user secures the connection by altering the length of the installation belt 118 to tighten down the child car seat 10 on the automobile passenger seat.

FIG. 5 shows the installation belt 118 anchored to an infant carrier bed 60. The infant carrier bed 60 has a pair of side belt restraining guides 212 and a pair of rear belt restraining guides 214. An anchor point 216 on the outer face of a wall 230 is located substantially midway between the pair of side belt restraining guides 212. A free end 128 of the belt excess portion 126 is permanently attached to the anchor point 216 to moor the installation belt 118 to the infant carrier bed 60.

FIG. 6 shows an alternative embodiment in which the inner region of an infant carrier bed 460 has an anchor point 416. The infant carrier bed 460 has a pair of belt restraining guides 414 formed on a wall 430 at a region near the anchor point 416. FIG. 6 shows the installation belt 118 attached to the anchor point 416 on the inner region base of the infant carrier bed 460. FIG. 6 also shows the installation belt 118 threaded into the pair of belt restraining guides 414 on the wall 430 at the same end as the anchor point 416.

A user physically threads the installation belt 118 into either set of the belt restraining guides 212 or 214 on the infant carrier bed 60. The user grasps a fastener 20 on the installation belt 118 and inserts the fastener 20 through one passageway. Then the user pulls the fastener 20 to draw the belt intermediate region 124 through the one passageway. Next, the user grasps and inserts the other fastener 20 through the remaining passageway and pulls the fastener 20 to draw the belt intermediate region 124 through the remaining passageway. Finally, the user attaches the infant carrier bed 60 to the automobile passenger seat by connecting each fastener 20 to the respective cooperating loop structure on the automobile passenger seat. The user secures the infant carrier bed 60 by altering the length of the installation belt 118 to tighten down the infant carrier bed 60 on the automobile passenger seat.

When not in use, the installation belt 18 is housed in a storage receptacle 50 included on the child car seat 10. The storage receptacle 50 is permanently attached to the child car seat 10 and has a portion defining a belt storage area 52. FIG. 7 illustrates the preferred embodiment for the storage receptacle 50, in which the anchor point 516 for the tether first end 32 is included on the storage receptacle 50. The storage receptacle 50 is typically made of a rigid material, such as the polymer composing the child car seat 10. Alternatively, the storage receptacle 50 may be a pouch made of flexible netting, having a drawstring around the pouch upper perimeter.

In an additional alternative embodiment for the storage receptacle 50, a storage receptacle 350 has a fastener attachment slot 354 and an anchor point 316. The fastener attachment slot 354 is formed to receive the fastener 20 as shown in FIG. 8. The portion of the storage receptacle 350 having the fastener attachment slot 354 is angled away from the child car seat 10, so the attached fastener 20 is sufficiently spaced from the storage receptacle 350 to allow the user to easily grasp the fastener 20.

As illustrated in FIG. 9, the fastener 20 has a hook 21, a flexible pawl 23, and a slot 25. An end of the flexible pawl 23 rests against a tip of the hook 21, and an opposite end of the flexible pawl 23 is fixed to a portion of the fastener region near the slot 25. The fastener 20 is typically made of a hard metal or rigid polymer. The slot 25 receives the ends 17 and 19 of the installation belt 18. The ends 17 and 19 are slightly wider than the slot 25 to prohibit shifting when the ends 17 and 19 are attached to the slot 25.

Alternatively, the fastener 20 may be a press-release buckle from a conventional seat belt. A typical press-release buckle engages a tongue structure on the automobile seat to form a detachable connection. Pushing a button on the press-release buckle causes the tongue to be released from the buckle.

In operation of the preferred embodiment for the fastener 20, a user contacts the flexible pawl and the cooperating loop structure on the automobile seat, which is typically a metal loop attached between the passenger seat back and base. The user moves the metal loop along the flexible pawl 23 to the end that rests against the tip of the hook 21. Then the user applies pressure to cause the flexible pawl 23 to leave contact with the tip of the hook 21, thereby causing the metal loop to be snagged by the hook. The pawl returns to the original position, in contact with the tip of the hook 21. The metal loop is retained on the hook until the user again causes the flexible pawl 23 to lose contact with the tip of the hook 21, thereby causing the metal loop to be released from the fastener 21.

While certain preferred embodiments of the present invention have been disclosed in detail, it is to be understood that various modifications may be adopted without departing from the spirit of the invention or scope of the following claims.

What is claimed is:

1. An improved child car seat having a plurality of belt restraining guides for securing the child car seat to an automobile seat, the improvement comprising:

(a) an installation belt for securing the child car seat to the automobile seat, the installation belt having a belt length adjuster, a belt first end having a fastener, a belt second end having a fastener, and a belt intermediate region between the ends; and (b) a tether having a tether first end attached to an anchor point on the child car seat and a tether second end attached to an anchor point on the installation belt, wherein the installation belt is anchored to the child car seat only by the tether.

2. The child car seat of claim 1, wherein the tether has a length at least equal to the distance from the anchor point on the child car seat to the anchor point on the installation belt when the installation belt is positioned in the restraining guides.

3. The child car seat of claim 1, wherein the tether is a steel cord.

4. The child car seat of claim 1, wherein the tether is an excess portion of the installation belt material, extending from the installation belt and having a free end as the tether first end attached to the anchor point on the child car seat.

5. The child car seat of claim 1, wherein the tether is a chain.

6. The child car seat of claim 1, wherein the tether is a rope.

7. The child car seat of claim 1, wherein the child car seat includes a storage receptacle for the installation belt.

8. The child car seat of claim 7, wherein the storage receptacle includes the anchor point on the child car seat to which the tether first end is attached.

9. The child car seat of claim 1, wherein the belt length adjustor includes the anchor point on the installation belt to which the tether second end is attached.

10. The child car seat of claim 1, wherein at least one of the fasteners includes the anchor point on the installation belt to which the tether second end is attached.

11. The child car seat of claim 1, wherein the belt length adjuster is engaged to the belt intermediate region.

12. The child car seat of claim 1, wherein at least one of the fasteners includes the belt length adjuster.

13. The child car seat of claim 1, wherein each fastener is a push-button release buckle.

14. The child car seat of claim 1, wherein each fastener is a hook having a flexible pawl.

15. An improved child car seat having a plurality of belt restraining guides for securing the child car seat to an automobile seat, the improvement comprising:

(a) an installation belt for securing the child car seat to the automobile seat, the installation belt including
        (i) a belt length adjuster,
        (ii) a non-adjustable belt portion having a fastener attached at one end and attached at its opposite end to the belt length adjuster, and
        (iii) an adjustable belt portion having a first end attached to a second fastener, and a second end that winds through and exits the length adjuster; and (b) a tether formed by an excess belt portion extending from the second end of the adjustable belt portion, the excess belt portion having a free end that is attached to an anchor point on the child car seat, wherein the installation belt is tethered to the child car seat only by said excess belt portion.

* * * * *